United States Patent [19]
Anderson

[11] Patent Number: 5,365,294
[45] Date of Patent: Nov. 15, 1994

[54] METHOD AND APPARATUS FOR CREATING CYLINDRICAL THREE DIMENSIONAL PICTURE

[75] Inventor: Victor G. Anderson, Arlington, Tex.

[73] Assignee: Pinnacle Brands, Inc., Grand Prairie, Tex.

[21] Appl. No.: 2,969

[22] Filed: Jan. 11, 1993

[51] Int. Cl.$^5$ .............................................. G03B 35/00
[52] U.S. Cl. ...................................... 354/112; 352/58
[58] Field of Search ................... 352/53, 58, 81, 101; 354/110, 292, 112; 355/22

[56] References Cited

U.S. PATENT DOCUMENTS

| | | | |
|---|---|---|---|
| 1,930,228 | 10/1933 | Draper | 352/58 |
| 2,661,651 | 12/1953 | Stipek | 352/58 |
| 2,928,313 | 3/1960 | Hattori | 352/58 |
| 3,178,720 | 4/1965 | Collender | 352/58 |
| 3,683,772 | 8/1972 | Jones | 352/69 |
| 3,815,979 | 6/1974 | Collender | 352/58 |
| 4,089,597 | 5/1978 | Collender | 352/53 |
| 4,158,487 | 6/1979 | Collender | 352/38 |
| 4,176,923 | 12/1979 | Collender | 352/58 |
| 4,231,642 | 11/1980 | Collender | 352/58 |
| 4,349,252 | 9/1982 | Collender | 352/58 |
| 4,414,316 | 11/1983 | Conley | 430/496 |
| 4,547,050 | 10/1985 | Collender | 352/43 |
| 5,028,518 | 7/1991 | Lyons et al. | 430/506 |
| 5,083,199 | 1/1992 | Borner | 352/58 |
| 5,148,310 | 9/1992 | Batchko | 352/53 |

Primary Examiner—Michael L. Gellner
Assistant Examiner—Nicholas T. Tuccilo
Attorney, Agent, or Firm—Herbert J. Hammond

[57] ABSTRACT

A cylindrical three dimensional picture capable of being viewed through an angle of 360° includes a cylinder surrounded by a 3D photograph, in turn surrounded by a flexible lenticular lens through which a film strip, subsequently developed into the photograph, is exposed and the subsequent photograph viewed, resulting in an image of a subject which appears to have been shrunken and enclosed within the cylinder. The film strip is exposed to sequential multiple images taken of a subject by a multiple imaging camera as the subject rotates 360°. The film strip is exposed to the multiple images through a lenticular lens as the lens and film are rotated 360° in a first embodiment, and is exposed to the multiple images linearly through a flat lenticular lens as the lens moves linearly across the projection beam of the multiple images in a third embodiment of the invention. In a second embodiment, the lens and film are mounted for rotation into a modified conventional viewing camera and exposed directly to images of the rotating subject as the subject is photographed. The lenticular lens and film strip may be separate layers or a unitary film strip having a lenticulated surface.

47 Claims, 5 Drawing Sheets

PARALLEL RAYS FROM PROJECTED IMAGE

METHOD AND APPARATUS FOR CREATING CYLINDRICAL THREE DIMENSIONAL PICTURE

TECHNICAL FIELD

This Invention relates to a method and apparatus for producing a three dimensional picture, and more particularly to a method and apparatus for producing a cylindrical 3 D picture capable of being viewed through an angle of 360°.

BACKGROUND OF THE INVENTION

Since the birth of photography, photographers and viewers have strived to make pictures more realistic by creating three dimensional images. This has lead to the development of a wide range of methods and equipment for recording and viewing three dimensional images. Such methods included the viewing of the images through special lenses, such as 3 D glasses for the individual viewer; the creation of images on a flat surface through use of parallel circular lenses in conjunction with line screens having alternate opaque and transparent vertical lines; creating three dimensional images through use of a plurality of angularly spaced mirrors; viewing images through rapidly moving screens having spaced part openings; viewing a television screen through a series of vertically extending cylindrical lenses mounted to the television screen between the viewer and the television screen; and rapidly rotating a screen displaying a fast changing series of images generated by an external projector rotating synchronously with the screen.

None of the prior methods of creating and viewing 3 D figures have resulted in the creation of a three dimensional fixed image that can be viewed through an angle of 360°. In the past, fixed 3 D images have been limited to a viewing range substantially less than a full 360° angle. Thus, although prior art 3 D images appeared to have depth, they were not capable of being viewed through an angle of 360°.

SUMMARY OF THE INVENTION

The 3 D picture and the method and apparatus for creating the 3 D picture of the present invention overcome the foregoing limitations associated with creation and viewing of three dimensional images by creating a cylindrical 3 D picture which may be viewed through an angle of 360°, such that the image of a photographed subject appears to be encased within a viewing cylinder. The cylinder on which the 3 D picture is mounted for viewing may be of any circumference. Surrounding the exterior of the cylinder is a photograph containing multiple, sequential, images of the subject, in turn surrounded by a lenticular lens through which the photograph is viewed. Although in the present embodiment of the invention, a cylindrical substrate is used to support the lenticular lens and underlying photograph, other geometric shapes may be used to achieve the desired result.

In another embodiment of the invention, the cylindrical or other geometrically shaped support has a lenticulated outer surface with the photograph placed inside the support such that the photograph is viewed through the lenticulated surface of the support. Thus, the support functions as the viewing lens as well.

To produce the three dimensional images, a multiple imaging camera is positioned to take multiple, sequential images of a subject as the subject is rotated 360°, creating a first sequential film strip depicting the subject from all angles of rotation. The images of the first film strip are then projected sequentially frame-by-frame through the lenticular lens and onto a second film strip surrounding an exposure cylinder as the cylinder is rotated 360°. The exposure cylinder is enclosed within a housing having a vertical aperture for exposing the second film strip as the exposure cylinder is rotated within the housing. The aperture has a width equal to the subtended chord of the lobe angle of the lenticular lens.

In a method for direct exposure of the film strip incorporating a second embodiment method of the present invention, the rotating subject is photographed with a conventional viewing camera modified by replacing the film holder with the housing and exposure cylinder mounted therein. A film strip is mounted onto the cylinder and surrounded by a lenticular lens. The vertical aperture is in alignment with the camera aperture for exposing the film through the lenticular lens. As the rotating subject is photographed, the exposure cylinder rotates within the housing at a rate of speed equal to the rate of rotation of the subject, thereby exposing the film strip through the lenticular lens as the exposure cylinder rotates past the aperture.

In a method for linear exposure of the film strip incorporating a third embodiment method of the present invention, a film strip and a lenticular lens, both equal in width to the circumference of the desired viewing cylinder, are mounted onto a vacuum film holder positioned for linear movement along a track in a light tight housing, a housing sealed to prohibit penetration of light except through an appropriate aperture. The film strip is exposed through the lens as the vacuum film holder moves along the track past an aperture in the housing.

Once exposed through the lenticular lens, the film strip is processed and the resulting photograph mounted surrounding a viewing cylinder having the same circumference as the exposure cylinder or same width as the linearly exposed film strip. A lenticular lens surrounds the photograph to create an illusion of the subject being reduced in size and encased within the cylinder.

In production, the lenticular lens and second film strip consist of a film strip separate from the lenticular lens, or a unitary strip having the lenticular lenses extending transversely across the width of the film strip on one side with the photo emulsion bonded to a second side of the film strip opposite the lenticular lenses. The unitary strip is unwound from a first film canister, and is rotated around the exposure cylinder for sequential exposure of the entire length of film to a continuously repeated series of 3 D images, and subsequently wound onto a second film canister where the film is stored until it is processed. Once the lenticular film strip has been processed, each repeated series photographed is cut into a separate length equal to the circumference of the exposure/viewing cylinder. Thus, many separate cylindrical three dimensional pictures may be produced continually from a length of the unitary lenticular film strip.

The lenticular surface of the unitary film strip is formed by rotating a continuous length of plastic film base material, coated on one side with an ultraviolet polymer, over the surface of a negative lenticulated cylinder while exposing the base material to an ultraviolet light source, creating the ribbed surface of the lenticular strip. The lenticular strip is then coated on the side opposite the textured surface with the desired photo emulsion, thereby creating a unitary film strip having a lenticulated surface through which the photo emulsion is later exposed to the projected multiple images.

BRIEF DESCRIPTION OF THE DRAWINGS

For a more complete understanding of the present invention and the advantages thereof, reference is now made to the following Detailed Description taken in conjunction with the accompanying Drawings in which.

DETAILED DESCRIPTION

Figures 1, 2, 3, 4:
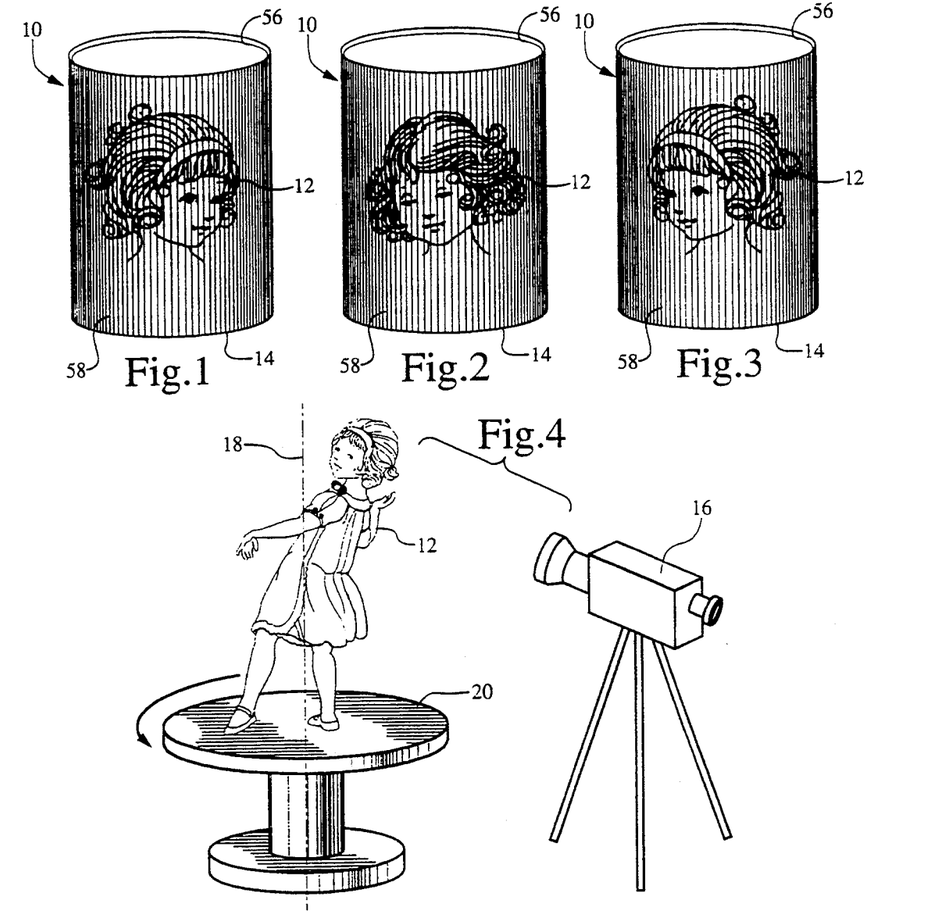
FIG. 1 is a side view of a cylindrical three dimensional picture of the present invention.
FIG. 2 is a front view of the cylindrical 3 D picture of FIG. 1.
FIG. 3 is a view of the cylindrical 3 D picture of FIG. 1 as seen from a third angle.
FIG. 4 is a drawing illustrating the manner in which the subject of the cylindrical 3 D picture of FIG. 1 is photographed as the subject rotates through a 360° angle in an indirect exposure method incorporating a first embodiment method of the present invention and a direct exposure method incorporating a second embodiment method of the present invention.

Referring now to the Drawings and more particularly to FIGS. 1, 2 and 3, there is shown a cylindrical three dimensional picture 10 capable of being viewed through an angle of 360°. As the picture 10 is rotated by the viewer, such that it is viewed from a variety of different angles as represented in FIGS. 1, 2, and 3, the subject 12 appears to be encased within a viewing cylinder 14.

Figure 5:
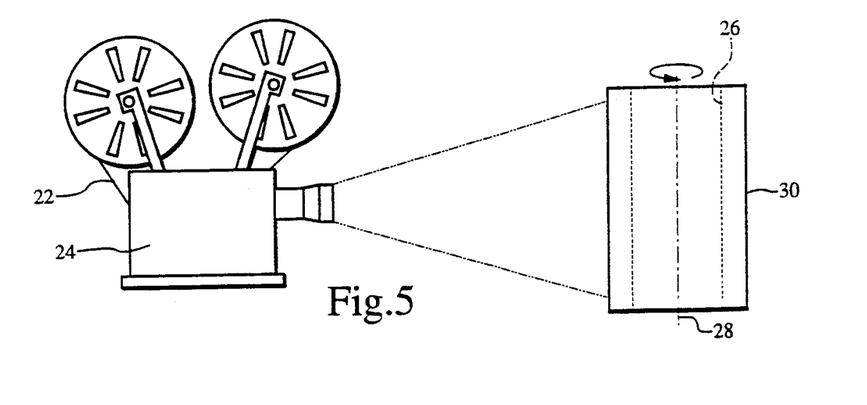
FIG. 5 is a drawing illustrating a method for exposing the images photographed in FIG. 4 through a lenticular lens onto a film strip surrounding a cylinder as the cylinder rotates 360° in the first embodiment method of the present invention.

Referring now to FIGS. 4 and 5, there is illustrated a first embodiment method for producing the cylindrical 3 D picture of the present invention. To overcome the viewing angle limitations of prior art 3 D pictures necessary to accomplish the cylindrical 3 D picture of FIGS. 1, 2 and 3, in a first embodiment of the present invention, the subject 12 is repeatedly photographed with a camera 16 through 360° as the subject is rotated 360° on a turntable 20 positioned for rotational movement about a vertically extending axis 18. In the first embodiment of the invention, the camera 16 is preferably a multiple imaging camera. The sequential, multiple images of the subject photographed are preserved on film 22, FIG. 5.

Figures 6, 7:
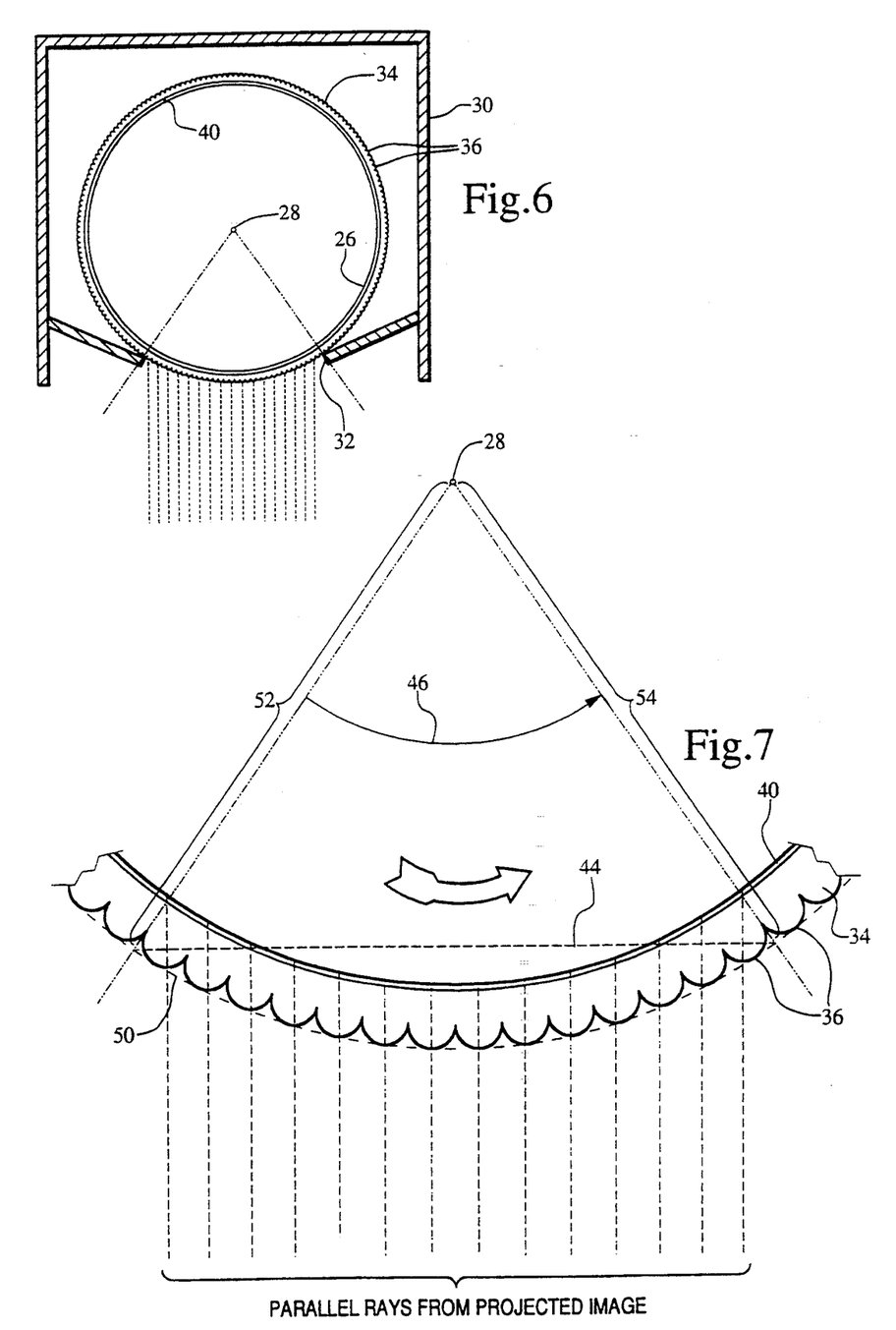
FIG. 6 is a section view of the cylinder of FIG. 5 within a housing having an aperture for exposing the film strip as illustrated in FIG. 5.
FIG. 7 is a partial top view of the cylinder of FIG. 6 illustrating the exposure of the lenticular film strip through the lenticular lens as the cylinder rotates.

The images are then projected through a projection device 24 onto an exposure cylinder 26, as the exposure cylinder 26 rotates through an angle of 360° about a vertically extending axis 28. As illustrated in FIGS. 5 and 6, the exposure cylinder 26 is contained within a light tight housing 30 having an aperture 32 therein for projection of the multiple images from the film 22 onto the exposure cylinder 26 as it rotates adjacent the aperture 32.

Referring now to FIGS. 6 and 7, surrounding the exposure cylinder 26 is a lenticular lens 34 formed of a plurality of individual, semi-circular, vertically extending, parallel lenticulars 36 defining a first lenticulated surface and a second smooth surface 40 opposite the lenticulated surface. Surrounding the exposure cylinder 26 and facing outwardly toward the smooth surface 40 of the lenticular lens 34 is a photo emulsion or film layer 42. As the exposure cylinder 26 rotates through an angle of 360° about the vertically extending axis 28, the photo emulsion or film layer 42 is exposed to sequential, multiple images as the exposure cylinder 26 passes the aperture 32.

Figure 8:
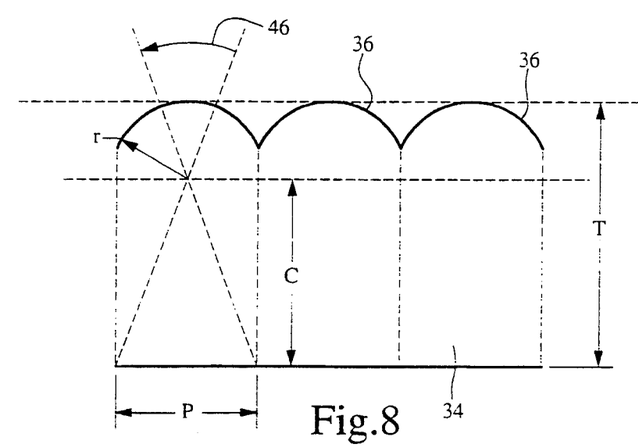
FIG. 8 is a partial cross section of the lenticular lens of FIG. 6 illustrating the calculation of the lens lobe angle.

The width 44 of the aperture 32 is equal to the subtended chord, FIG. 7, of the lens lobe angle 46, FIGS. 7 and 8. The lens lobe angle 46 is determined by the lens thickness and lens frequency or pitch. Although a variety of lobe angles may be used, in the preferred embodiment of the invention a lobe angle of 72° has been chosen because it represents the maximum angle for the sharpest exposure of the underlying photo emulsion or film layer 42.

Referring now to FIGS. 6, 7 & 8, the width 44 of the aperture 32 corresponds to the lens lobe angle 46, which is determined by the formula: Lobe angle $(\angle°) = 2[\tan(0.5\ P/C)]$, where P (pitch) $= 1/L$ and L is the number of individual lenticulars 36 per inch. $C = T - r$, where T is the thickness of the lenticular lens 34 (FIG. 8) and is the product of the index of refraction for the particular lens material and the radius of curvature of the individual lenticular 36. For a lens made from poly vinyl chloride, for example, $T = 2.7\ r$; and for polystyrene, $T = 2.43\ r$.

The width 44 of the aperture 32 is equal to the subtended chord of the lens lobe angle 46, or $2[\sin(\mathrm{Lobe}\angle°/2)\ R]$, where R (shown at 52) is the radius 54 of the desired cylinder plus T, the thickness of the lenticular lens 34.

Figure 9:
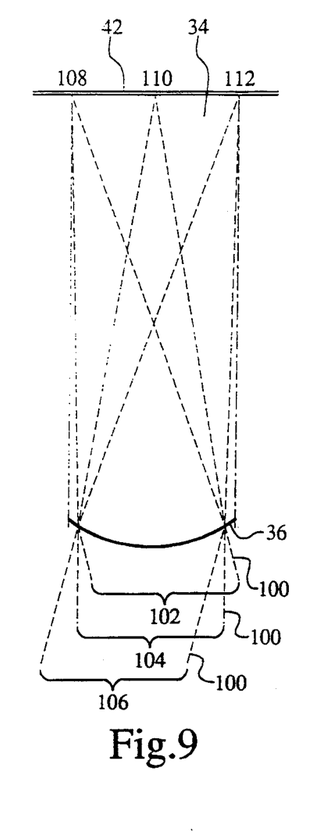
FIG. 9 is a diagrammatic cross section of an individual lenticular of the lenticular lens of FIG. 6, illustrating representative angles of exposure of the film strip with respect to each individual lenticular.
Figure 10:
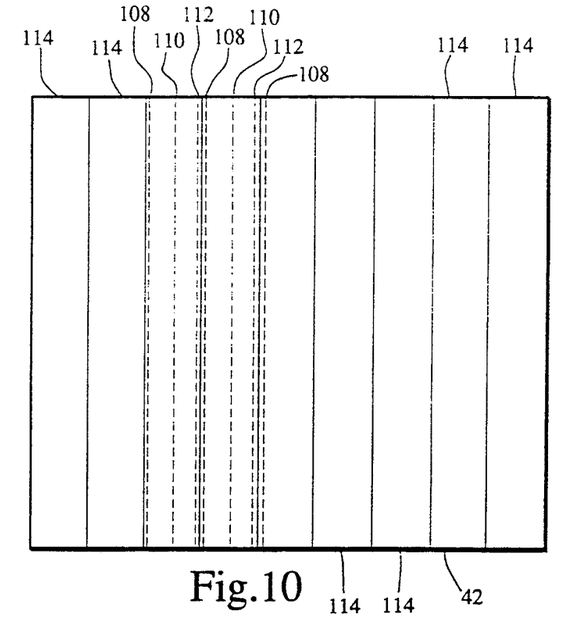
FIG. 10 is a front view of the film strip illustrating the areas of exposure in relation to individual lenticulars of the lenticular lens.

Referring now to FIGS. 6, 9, and 10, as the exposure cylinder 26 rotates, the projection beam 100 strikes the surface of the individual lenticulars 36 formed in lenticular lens 34 from a series of representative angles as shown at 102, 104, and 106 (FIG. 9). As the projected beam 100 strikes the surface of the individual lenticulars 36, the rays are refracted and converge at focal points 108, 110, and 112 (FIG. 9), corresponding to the contact angles shown at 102, 104, and 106 (FIG. 9), respectively, exposing the photo emulsion or film layer 42.

As illustrated in FIG. 10, exposure of the photo emulsion or film layer 42, at focal points 108, 110, and 112 is repeated for each individual lenticular 36 represented by lines 114. It is understood that the photo emulsion or film layer 42 will be exposed along a multiplicity of focal points corresponding to angles of contact of the projector beam 100 through the lenticular lens 34, with focal points 108, 110, and 112 merely being representative for purposes of illustration of the present invention. Thus, each exposed individual lenticular 36 across the aperture 32 (FIG. 6) continues to record its share of the sequential images projected thereon as it travels from one side of the aperture 32 to the other, finally exposing the entire 360° of photo emulsion or film layer 42 surrounding the exposure cylinder 26 (FIG. 6) as the rotation is completed.

Referring again to FIGS. 1 and 6, once exposed through the lenticular lens 34, the photo emulsion or film layer 42 is processed and the resulting photograph 56 mounted surrounding the viewing cylinder 14 having the same circumference as the exposure cylinder 26. A second lenticular lens 58 surrounds the photograph 56 to create an illusion of the subject 12 being reduced in size and encased within the viewing cylinder 14. Although in the preferred embodiment of the present invention, the photograph 56 is disposed between the viewing cylinder 14 and the second lenticular lens 58, the second lenticular lens 58 may itself be shaped to form the viewing cylinder 14, such that the photograph 56 is placed within the second lenticular lens 58 for viewing without a separate viewing cylinder 14. Likewise although in the preferred embodiment of the present invention, the viewing substrate is cylindrical in shape, other geometrical shapes may be used.

Referring again to FIGS. 4 and 6, there is illustrated a method for direct exposure of the photo emulsion or film layer 42, incorporating a third embodiment method for producing the cylindrical 3 D picture 10 of the present invention. In the direct exposure method, the camera 16 is a conventional viewing camera modified by replacing the film holder with the light tight housing 30 and exposure cylinder 26 mounted therein. The film-/emulsion layer 42 is mounted onto the exposure cylinder 26 and surrounded by the lenticular lens 34. The vertical aperture 32 is in alignment with the camera 16 aperture for exposing the photo emulsion or film layer 42 through the lenticular lens 34. As the rotating subject 12 is photographed, the exposure cylinder 26 rotates within the light tight housing 30 at a rate of speed equal to the rate of rotation of the subject 12, thereby directly exposing the photo emulsion or film layer 42 to sequential images of the subject 12 through the lenticular lens 34 as the exposure cylinder 26 rotates past the aperture 32.

Figure 11:
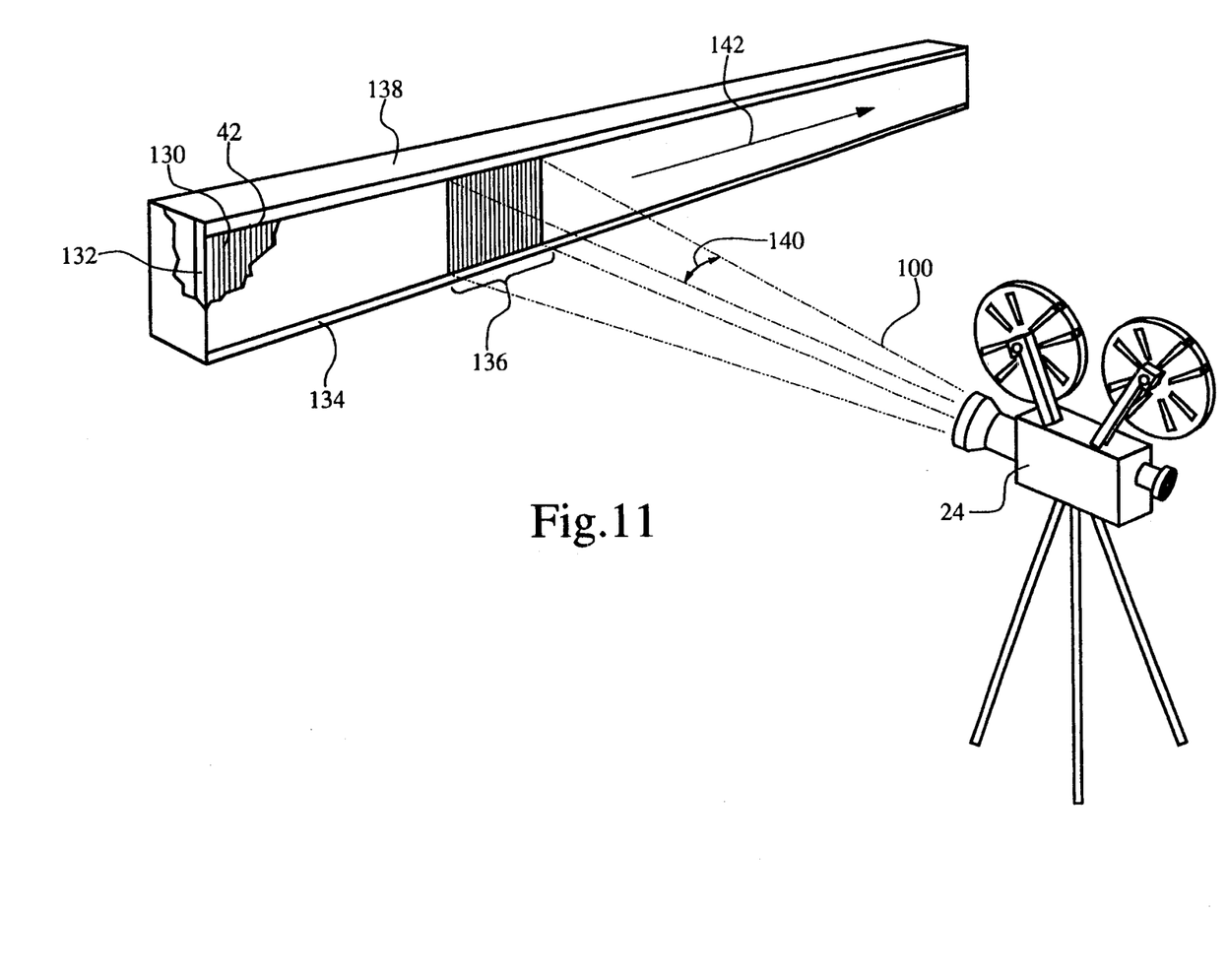
FIG. 11 is a drawing illustrating a linear method for exposing the film strip through a lenticular lens incorporating a third embodiment method of the present invention.

Referring now to FIG. 11, there is illustrated a linear method for exposing the photo emulsion or film layer 42 through a lenticular lens 130, incorporating a third embodiment method for producing the cylindrical 3 D picture 10 of the present invention. Equal widths of photo emulsion or film layer 42 and the lenticular lens 130, representing the circumference of the desired viewing cylinder, are mounted onto a vacuum film holder 132 for linear movement along a track 134 mounted within a light tight enclosure 138. The light tight enclosure 138 has an exposing aperture 136 between the vacuum film holder 132 and the projection device 24. As the vacuum film holder 132 and photo emulsion or film layer and lenticular lens 130 mounted thereon move linearly in the direction indicated by arrow 142 along the track 134 within the light tight enclosure 138, the photo emulsion or film layer 42 projection is exposed by the beam 100 through the lenticular lens 130 as the vacuum film holder 132, photo emulsion of film layer, and lenticular lens 130 pass the aperture 136.

Referring now to FIGS. 9 and 11, the representative contact angles 102, 104, and 106 (FIG. 9) of the image projection beam 100 projected from the projection device 24 are achieved through linear movement of the lenticular lens 130 across the projection beam 100. In the preferred embodiment of the invention, the length of the vacuum film holder 132 is equal to the circumference of the proposed viewing cylinder 14. As with the first embodiment method for making the cylindrical 3 D picture 10, the aperture 136 through which the photo emulsion or film layer 42 is exposed is equal in width to the subtended chord of the lens lobe angle 46 (FIG. 7), where the projection angle 46 140 is equal to the lens lobe angle, and the length of the subtended chord is determined by the distance of the projection device 24 from the lens surface.

It has been determined that a lens lobe angle 46 of 20° produces a 3 D image of suitable resolution when the film is exposed linearly. Due to the narrow lens lobe angle, linear exposure requires exposure of the photo emulsion or film layer 42 to multiple images of the subject 12 photographed through a full 360° angle of rotation, plus an additional one-fifth of the rotation to expose a length of photo emulsion or film layer 42 equal to the circumference of the viewing cylinder 14.

Figure 12:
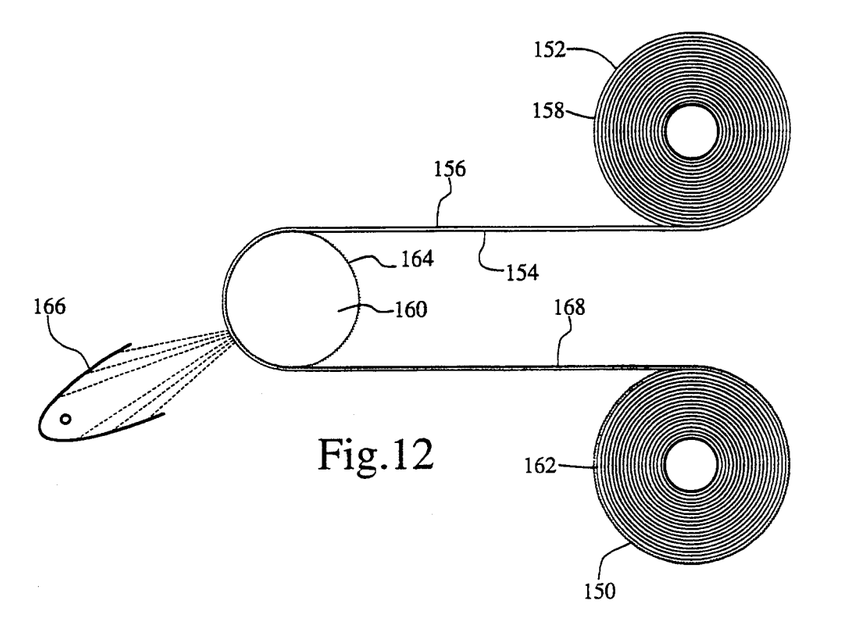
FIG. 12 is a drawing illustrating the formation of a unitary lenticular film strip.

Referring now to FIG. 12, a unitary lenticular lens film strip 150 may be substituted for the separate lenticular lens 34 and associated photo emulsion or film layer 42. A plastic film base material 152 having a first side 154 and a second side 156 is coated on the first side 154 with an ultraviolet polymer. The base material 152 is wound from a first film canister 158 over a negative lenticulated cylinder 160 and onto a second film canister 162. Adjacent, vertically extending parallel indentions 164 cover the surface of the negative lenticulated cylinder 160 and correspond to the curvature of a desired lenticular lens.

As the coated base material 152 passes over the negative lenticulated cylinder 160, it is exposed to an ultraviolet light source 166, which cures and solidifies the coating creating the lenses on the first side 154 of the base material 152 corresponding to the indentions 164 in the surface of the negative lenticulated cylinder 160. The resulting lenticular lens film strip 168, is wound onto the second film canister 162 from the negative lenticulated cylinder 160.

Figure 13:
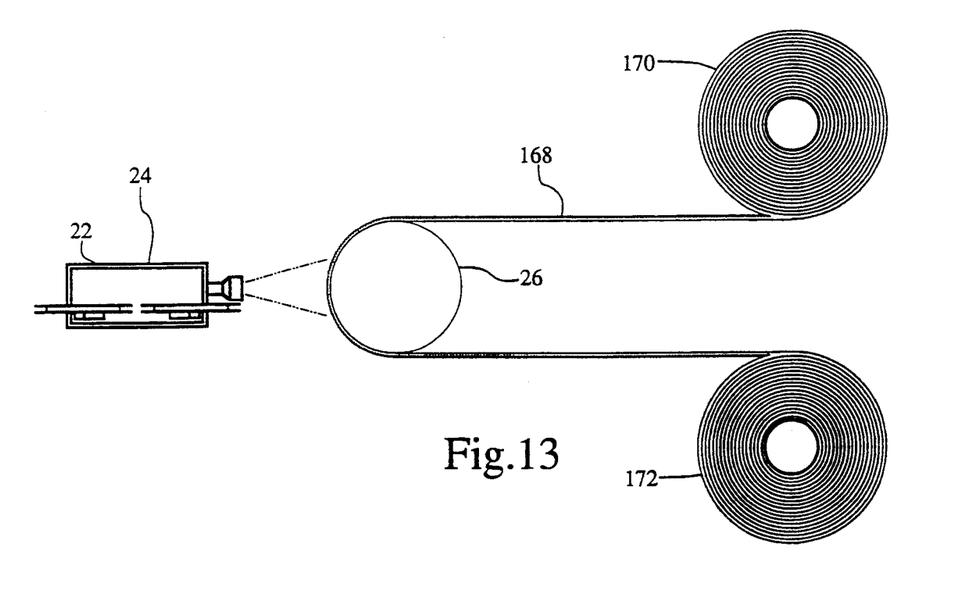
FIG. 13 is a drawing illustrating the exposure of the unitary lenticular film strip of FIG. 12.

Referring now to FIG. 13, the lenticular lens film strip 168 is coated on the second side 156 with a photo emulsion and wound onto a third light tight film canister 170 for storage and subsequent use in making the cylindrical 3 D picture 10 of the present invention. When exposing the lenticular lens film strip 168, sequential images from the multiple image film 22 are projected by the projection device 24 onto the lens film strip 168 as it rotates around the exposure cylinder 26. The multiple image film strip 22 is a continuous loop such that the series of sequential multiple images taken of the subject as it rotates 360° is repeatedly projected onto the lens film strip 168, with an exposure of one complete series equal in length to the circumference of the viewing cylinder 14.

The exposed lens film strip 168 is then wound on a fourth film canister 172 for storage and subsequent developing of the film strip 168. Upon developing the lens film strip 168, the resultant photographs of the repeated series of sequential, multiple images are separated by cutting the photographs produced from the film strip 168 into lengths equal to the circumference of the viewing cylinder 14. Each segment is then mounted to a viewing cylinder or can be cylinderized separately without a cylinder, thereby producing a plurality of cylindrical 3 D pictures 10. The use of the unitary lens film strip 168 alleviates blurring or fuzzy images as a result of improper alignment between a separate flexible lenticular lens and underlying photograph when mounted on the viewing cylinder 14, and allows production of multiple copies of the cylindrical 3 D picture 10 at one time.

Although preferred embodiments of the present invention have been illustrated in the accompanying Drawings and described in the foregoing Detailed Description, it is to be understood that the same is by way of illustration and example only and is not to be taken by way of limitation, the spirit and scope of the invention being limited only to the terms of the appended claims.

I claim:

1. A three dimensional picture viewable by an observer through an angle of 360° comprising:
   a photograph containing a series of sequential images of a subject photographed while being rotated through an angle of 360°; and
   a lenticular lens disposed between the photograph and the observer to permit the image of the subject recorded on the photograph to be viewed through an angle of 360°.

2. The three dimensional picture of claim 1, further comprising means for maintaining the lenticular lens in fixed relationship between the photograph and the observer.

3. The three dimensional picture of claim 2, wherein the means for maintaining the lenticular lens in fixed relationship comprises a generally cylindrically shaped substrate for supporting the lens and photograph wrapped therearound.

4. The three dimensional picture of claim 1, wherein the lenticular lens further comprises a lenticular lens through which a photo emulsion is exposed and the resulting photograph subsequently viewed, having a first surface comprised of a plurality of vertically extending, parallel circular lenses and a second smooth surface opposite the first surface.

5. The three dimensional picture of claim 4, wherein the photograph is formed from a photo emulsion coated on the second surface of the lenticular lens and exposed through the lens.

6. The three dimensional picture of claim 4, wherein the flexible lenticular lens further comprises a roll of plastic film base having first and second sides and being coated on the first side with ultraviolet polymer and exposed to an ultraviolet light source as the coated film base is rotated around a negative lenticulated cylinder having vertically extending linear indentations to form a multiplicity of parallel semi-circular lenses extending across the width of the first side of the plastic film base.

7. The three dimensional picture of claim 6, wherein the photograph is formed by a photo emulsion coated on the second side of the plastic film base and exposed to a repeated series of sequential images to form a plurality of photographs of the repeated series of images subsequently separated by cutting the photographs into separate segments equal in length to a complete series of sequential images.

8. Apparatus for producing a three dimensional picture of a subject to create an image viewable through an angle of 360° comprising:
   rotating means for rotating a subject to be photographed about a vertically extending axis through an angle of 360°;
   camera means for sequentially photographing the subject at various angles as the subject rotates through an angle of 360° to produce a series of sequential images;
   projection means for projecting the sequential images onto a photo emulsion;
   support means for supporting the photo emulsion between the projection means and the support means; and
   a lenticular lens disposed between the projection means and the photo emulsion for exposure of the photo emulsion through the lenticular lens.

9. The apparatus for producing a three dimensional picture of claim 8, further comprising a viewing substrate for mounting a photograph resulting from the exposed photo emulsion disposed between the substrate and the lenticular lens for viewing the photograph through the lens through an angle of 360°.

10. The apparatus for producing a three dimensional picture of claim 8, wherein the support means further comprises moveable support means on which the lenticular lens and associated photo emulsion are mounted in vertical alignment with the projection means for linear movement of the lenticular lens and photo emulsion relative to the projection means as the sequential images are projected onto the photo emulsion.

11. The apparatus for producing a three dimensional picture of claim 8, wherein the support means further comprises an exposure cylinder mounted for rotation about a vertically extending axis in vertical alignment with the projection means and supporting the photo emulsion and lenticular lens to surround the cylinder for exposure to the projected sequential images as the cylinder rotates through an angle of 360° about the axis.

12. The apparatus for producing a three dimensional picture of claim 11, further comprising a light tight housing adjacent the projection means for retaining the exposure cylinder for rotation about the vertical axis and having an aperture facing the projection means for exposure of the photo emulsion.

13. The apparatus for producing a three dimensional picture of claim 12, wherein the width of the aperture in the housing is equal to the subtended chord of the lenticular lens lobe angle.

14. The apparatus for producing a three dimensional picture of claim 8, wherein the lenticular lens further comprises a roll of plastic film base having first and second sides and being coated on the first side with ultraviolet polymer for exposure to an ultraviolet light source for curing the film base as the coated film base is rotated around a negative lenticulated cylinder having vertically extending, linear indentations to form a multiplicity of parallel semi-circular lenses extending across the width of the first side of the film base.

15. The apparatus for producing a three dimensional picture of claim 14, further comprising a photo emulsion coating on the second side of the plastic film base for exposure to a repeated series of sequential images equal in length to the circumference of a viewing cylinder to form a plurality of three dimensional pictures subsequently separated by cutting the filmstrip into separate segments equal in length to the circumference of the viewing cylinder.

16. Apparatus for producing a cylindrical three dimensional picture viewable by an observer through an angle of 360° comprising:
   a turntable for rotating a subject to be photographed about a vertically extending axis through an angle of 360°;
   camera means for sequentially photographing the subject at various angles as the turntable rotates through an angle of 360° to produce a series of sequential images;
   projection means for subsequently projecting the sequential images onto a photo emulsion;
   support means for supporting the photo emulsion between the projection means and the support means;
   a first lenticular lens disposed between the projection means and the photo emulsion for exposure of the photo emulsion through the lenticular lens;
   a viewing cylinder around which a lenticulated photograph created from the exposed photo emulsion is mounted for viewing; and
   a second lenticular lens similar to the first lenticular lens and surrounding the photograph for viewing of the three dimensional image of the photographed subject therethrough.

17. The apparatus for producing a three dimensional picture of claim 16, wherein the support means further comprises an exposure cylinder mounted for rotation about a vertically extending axis in vertical alignment with the projection means and supporting the photo emulsion and lenticular lens to surround the cylinder for exposure to the projected sequential images as the cylinder rotates through an angle of 360° about the axis.

18. The apparatus for producing a three dimensional picture of claim 17, further comprising a light tight housing adjacent the projection means for retaining the exposure cylinder for rotation about the vertical axis and having an aperture facing the projection means for exposure of the photo emulsion.

19. The apparatus for producing a three dimensional picture of claim 18, wherein the width of the aperture in the housing is equal to the subtended chord of the lenticular lens lobe angle.

20. The apparatus for producing a three dimensional picture of claim 16, wherein the first and second lenticular lenses further comprise a single lenticular lens comprising a roll of plastic film base having first and second sides and being coated on the first side with ultraviolet polymer and exposed to an ultraviolet light source as the coated film base is rotated around a negative lenticulated cylinder having vertically extending linear indentations to form a plurality of parallel semi-circular lenses extending across the width of the first side of the plastic film base.

21. The apparatus for producing a three dimensional picture of claim 20, further comprising a photo emulsion coating on the second side of the plastic film base for exposure to a repeated series of sequential images equal in length to the circumference of a viewing cylinder to form a plurality of three dimensional pictures subsequently separated by cutting the filmstrip into separate segments equal in length to the circumference of the viewing cylinder.

22. Apparatus for producing a cylindrical three dimensional picture viewable through an angle of 360° comprising:
   a turntable for rotating a subject to be photographed about a vertically extending axis through an angle of 360° to produce a series of sequential images;
   a multiple imaging camera for sequentially photographing the subject as the turntable rotates through an angle of 360°;
   an exposure cylinder mounted for rotation about a vertically extending axis through an angle of 360°;
   a first lenticular lens mounted to and surrounding the cylinder;
   a film strip mounted between the cylinder and the lenticular lens and surrounding the cylinder;
   projection means for projecting the sequential images through the lenticular lens for exposing the film as the cylinder is rotated;
   a light tight housing adjacent the projection means for retaining the exposure cylinder for rotation about the vertical axis and having an aperture facing the projection means for exposure of the photo emulsion as the cylinder rotates about the axis;
   a viewing cylinder having the same circumference as the exposure cylinder and around which a photograph created from the exposed filmstrip is mounted for viewing; and
   a second lenticular lens mounted surrounding the viewing cylinder in registration with the photograph and with the photograph disposed between the viewing cylinder and the second lenticular lens for viewing the three dimensional image of the photographed subject therethrough.

23. The apparatus for producing a three dimensional picture of claim 22, wherein the width of the aperture in the light tight housing is equal to the subtended chord of the lenticular lens lobe angle and the radius of the viewing cylinder.

24. The apparatus for producing a three dimensional picture of claim 22, wherein the first and second lenticular lenses further comprise a single lens comprising a roll of plastic film base having first and second sides and being coated on the first side with ultraviolet polymer and exposed to an ultraviolet light source as the coated film base is rotated around a negative lenticulated cylinder having vertically extending, linear indentations to form a multiplicity of parallel semi-circular lenses extending across the width of the first side of the plastic film base.

25. The apparatus for producing a three dimensional picture of claim 24, further comprising a photo emulsion coating on the second side of the plastic film base for exposure to a repeated series of sequential images equal in length to the circumference of the viewing cylinder to form a plurality of three dimensional pictures subsequently separated by cutting photographs created from the filmstrip into separate segments equal in length to the circumference of the viewing cylinder.

26. Apparatus for producing a three dimensional picture of a subject to create an image viewable through an angle of 360° comprising:
   camera means having an aperture for sequentially photographing a subject at various angles as the subject rotates through an angle of 360° to produce a series of sequential images;
   support means mounted in the camera means for supporting a photo emulsion for exposure to the sequential images; and a lenticular lens disposed between the camera aperture and the photo emulsion for exposure of the photo emulsion through the lenticular lens.

27. The apparatus for producing a three dimensional picture of claim 26, further comprising a viewing substrate for mounting a photograph resulting from the exposed photo emulsion disposed between the substrate and the lenticular lens for viewing the photograph through the lens through an angle of 360°.

28. The apparatus for producing a three dimensional picture of claim 26, wherein the support means further comprises an exposure cylinder mounted for rotation about a vertically extending axis within the camera and supporting the photo emulsion and lenticular lens to surround the cylinder for exposure to the sequentially photographed images as the cylinder rotates through an angle of 360° about the axis.

29. The apparatus for producing a three dimensional picture of claim 28, further comprising a light tight housing within the camera for retaining the exposure cylinder for rotation about the vertical axis and having an aperture in alignment with the aperture of the camera for exposure of the photo emulsion.

30. The apparatus for producing a three dimensional picture of claim 29, wherein the width of the aperture in the housing is equal to the subtended chord of the lenticular lens lobe angle.

31. The apparatus for producing a three dimensional picture of claim 26, wherein the lenticular lens further comprises a roll of plastic film base having first and second sides and being coated on the first side with ultraviolet polymer for exposure to an ultraviolet light source for curing the film base as the coated film base is rotated around a negative lenticulated cylinder having vertically extending, linear indentations to form a multiplicity of parallel semi-circular lenses extending across the width of the first side of the film base.

32. The apparatus for producing a three dimensional picture of claim 31, further comprising a photo emulsion coating on the second side of the plastic film base for exposure to a repeated series of sequential images equal in length to the circumference of a viewing cylinder to form a plurality of three dimensional pictures subsequently separated by cutting the filmstrip into separate segments equal in length to the circumference of the viewing cylinder.

33. A method for creating a three dimensional picture viewable through an angle of 360°, comprising the steps of:
sequentially photographing a subject at a series of angles as the subject rotates through an angle of 360° to produce a series of sequential images;
projecting a beam of images corresponding to images photographed at selected angles through a first lenticular lens and onto the surface of a photo emulsion while simultaneously moving the lens and photo emulsion relative to the image beam;
developing the photo emulsion exposed in the previous step; and
disposing a second lenticular lens in registration with the photograph between the observer and the photograph for viewing of the three dimensional image therethrough.

34. The method for producing a three dimensional picture of claim 33, further comprising the step of mounting the resulting photograph on a supporting substrate.

35. The method for producing a three dimensional picture of claim 33, further comprising the step of mounting the first lenticular lens and the photo emulsion on and surrounding an exposure cylinder.

36. The method for producing a three dimensional picture of claim 35, further comprising the step of mounting the exposure cylinder for rotation about a vertically extending axis for exposure of the photo emulsion through the lenticular lens as the exposure cylinder rotates through an angle of 360°.

37. The method for producing a three dimensional picture of claim 36, further comprising the steps of enclosing the exposure cylinder for rotation within a light tight housing having an aperture equal in width to the subtended chord of the lenticular lens lobe angle, and exposing the photo emulsion by projecting the sequential images through the lenticular lens at a series of angles totalling the lens lobe angle as the cylinder rotates through an angle of 360° within the housing.

38. The method for producing a three dimensional picture of claim 33, further comprising the step of moving the first lenticular lens and the photo emulsion linearly in relation to the projected beam of images, projecting the images through the lenticular lens at a series of angles totalling the lenticular lens lobe angle to create the three dimensional picture.

39. The method for producing a three dimensional picture of claim 33, further comprising the step of using the same lens to expose the photo emulsion and to view the resultant photograph.

40. The method for producing a three dimensional picture of claim 33, further comprising the steps of:
coating a first surface of a plastic film base having first and second surfaces with ultraviolet polymer;
rotating the coated film base around a negative lenticulated cylinder having parallel indentations extending transversely relative to the first surface of the coated film base;
exposing the coated film base to an ultraviolet light source as it rotates around the negative lenticulated cylinder to cure the film base to form a multiplicity of parallel semi-circular lenses extending transversely across the first surface of the film base;
coating the second surface of the film base with photo emulsion to form a lenticular film strip;
exposing the length of the lenticular film strip to a repeated series of the sequential multiple images;
developing the lenticular film strip into a strip of repeated series of three dimensional photographs;
cutting the strip of three dimensional photographs into lengths corresponding to each repeated series equal in length to the circumference of a viewing cylinder;
mounting each individual length of three dimensional photographs on and surrounding the viewing cylinder; and
mounting the second lenticular lens surrounding the photograph for viewing the photograph therethrough.

41. A method for creating a three dimensional picture viewable through an angle of 360°, comprising the steps of:
sequentially photographing a subject at a series of angles as the subject rotates through an angle of 360° to produce a series of sequential images;
exposing the surface of a photo emulsion to the photographed images through a first lenticular lens while simultaneously moving the lens and photo emulsion relative to an aperture of a camera photographing the images;

developing the photo emulsion exposed in the previous step; and disposing a second lenticular lens in registration with the photograph between the observer and the photograph for viewing of the three dimensional image therethrough.

42. The method for producing a three dimensional picture of claim 41, further comprising the step of mounting the resulting photograph on a supporting substrate.

43. The method for producing a three dimensional picture of claim 41, further comprising the step of mounting the first lenticular lens and the photo emulsion on and surrounding an exposure cylinder.

44. The method for producing a three dimensional picture of claim 43, further comprising the step of mounting the exposure cylinder for rotation about a vertically extending axis for exposure of the photo emulsion through the lenticular lens as the exposure cylinder rotates through an angle of 360°.

45. The method for producing a three dimensional picture of claim 43, further comprising the steps of enclosing the exposure cylinder for rotation within a light tight housing having an aperture equal in width to the subtended chord of the lenticular lens lobe angle and in exposure alignment with the camera aperture for exposing the photo emulsion to the sequential images through the lenticular lens at a series of angles totalling the lens lobe angle as the cylinder rotates through an angle of 360° within the housing as the rotating subject is photographed.

46. The method for producing a three dimensional picture of claim 41, further comprising the step of using the same lens to expose the photo emulsion and to view the resultant photograph.

47. The method for producing a three dimensional picture of claim 41, further comprising the steps of:

coating a first surface of a plastic film base material having first and second surfaces with ultraviolet polymer;

rotating the coated film base around a negative lenticulated cylinder having parallel indentations extending transversely relative to the first surface of the coated film base;

exposing the coated film base to an ultraviolet light source as it rotates around the negative lenticulated cylinder to cure the film base to form a multiplicity of parallel semi-circular lenses extending transversely across the first surface of the film base;

coating the second surface of the film base with photo emulsion to form a lenticular film strip;

exposing the length of the lenticular film strip to a repeated series of the sequential multiple images;

developing the lenticular film strip into a strip of repeated series of three dimensional photographs;

cutting the strip of three dimensional photographs into lengths corresponding to each repeated series equal in length to the circumference of a viewing cylinder;

mounting each individual length of three dimensional photographs on and surrounding the viewing cylinder; and mounting the second lenticular lens surrounding the photograph for viewing the photograph therethrough.

* * * * *